April 2, 1929. N. E. JOHNSON Re. 17,258

ARCH SUPPORT

Original Filed Nov. 23, 1923 2 Sheets-Sheet 1

Inventor:
Nils E. Johnson
By
Wilson + McCamy
Attys.

April 2, 1929. N. E. JOHNSON Re. 17,258

ARCH SUPPORT

Original Filed Nov. 23, 1923 2 Sheets-Sheet 2

Inventor:
Nils E. Johnson
By
Wilson & McCanna
Attys.

Reissued Apr. 2, 1929. Re. 17,258

UNITED STATES PATENT OFFICE.

NILS E. JOHNSON, OF ROCKFORD, ILLINOIS, ASSIGNOR TO P. A. PETERSON, OF ROCKFORD, ILLINOIS; IDA MAY PETERSON EXECUTRIX OF THE ESTATE OF SAID P. A. PETERSON, DECEASED.

ARCH SUPPORT.

Original No. 1,548,469, dated August 4, 1925, Serial No. 676,482, filed November 23, 1923. Application for reissue filed June 8, 1927. Serial No. 197,479.

This invention relates to foot wear, and has for its principal object the provision of an improved shoe the sole structure of which will support the plantar surface of the normal foot in such manner as to insure proper balance and distribution of the weight and to properly sustain the arches of the foot. According to my invention I have provided an insole of novel shape and form properly supported for the purposes intended. In the preferred embodiment I have provided an improved shank member designed to be positioned between the insole and the outer sole of a shoe for strengthening the longitudinal arch thereof as well as being shaped to give proper support to the metatarsal and arched areas of the foot. I am aware that heretofore strengthening shanks have been provided which were also intended to support the metatarsal area and the longitudinal arch, but so far as I am aware, these prior structures, while they may have been suited for some particular weakened condition or displacement, have not been suitable as a commercial product for the average foot for satisfactorily supporting the plantar surface and for preventing weakening tendencies in the various arches of the normal foot.

I have, therefore, in the present invention, aimed to provide a shank member, preferably in the form of a sheet metal plate, which may be inserted in the average shoe both for the purpose of strengthening the longitudinal arch thereof and for functioning as a corrective and a preventive medium especially in respect to the metatarsal area and transverse arches of the foot. That is to say, if any weakened condition or displacement in this area exists in the average foot, my improved arch support and shank will function as a mechanical means for correcting the condition; and on the other hand, if the foot is normal, my improvements will properly support the plantar surface of the foot in a correct position and will prevent weakening tendencies. To this end, I have provided a combined arch support and shank characterized by its shape and location in a shoe, and preferably permanently incorporated in the shoe structure, all of which will be described in detail hereinafter.

Another object is to provide an arch support of the character described in which the anterior arched portion of the shank member underlying the metatarsal area is slotted or otherwise marginally shaped to give a resilient yet firm support.

Other objects and attendant advantages will be appreciated by those skilled in this art as the invention becomes better understood by reference to the following description when considered in connection with the accompanying drawings, in which—

Figure 2:
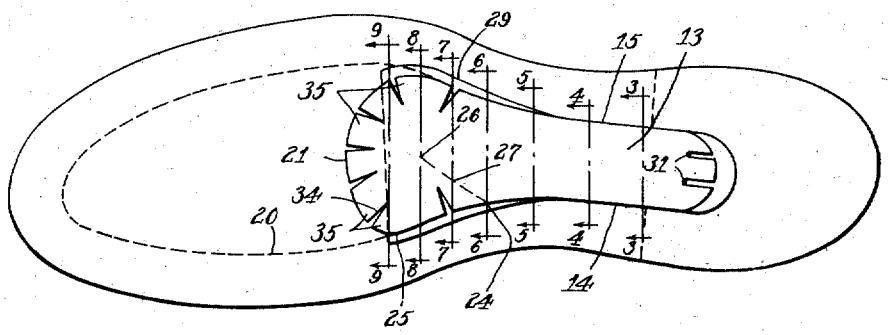
Fig. 2 is a diagrammatic top view showing one form of the shank and arch support plate in relation to a shoe.
Figure 3:
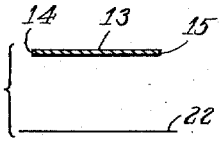
Figure 6:
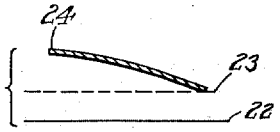
Figure 7:
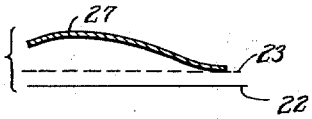
Figure 4:
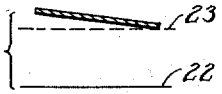
Figure 8:
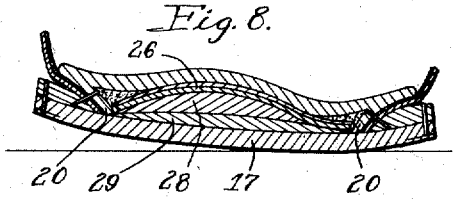
Figure 5:
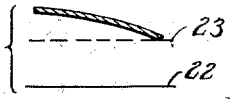
Figure 9:
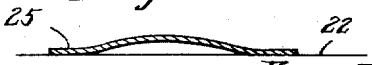
Figure 10:
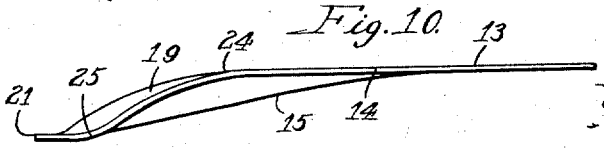
Figure 11:
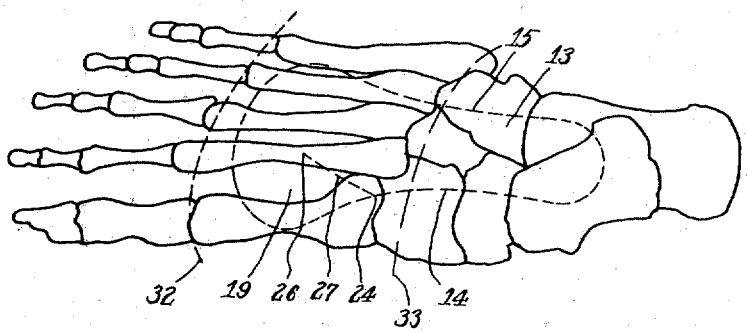
Figure 12:
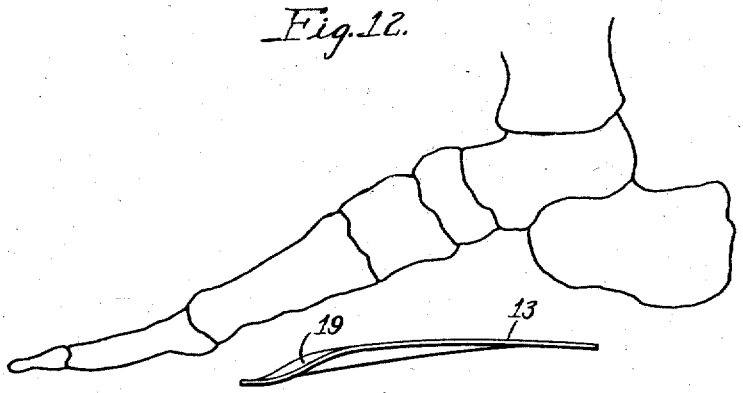

Figs. 3 to 7 inclusive and 9 are cross-sectional views, full size, through the plate taken on the lines 3—3, 4—4, 5—5, 6—6, 7—7 and 9—9, respectively, of Fig. 2;

Fig. 8 is a cross-section through the shoe taken substantially on the line 8—8 of Fig. 2;

Fig. 10 is a side view of the plate looking at the inner side thereof;

Fig. 11 is a top or dorsal view of the bones of a foot showing one form of my improved plate with relation thereto; and Fig. 12 is a side view of the foot bones showing the inner longitudinal arch and the relation of my improved plate thereto.

Figure 1:
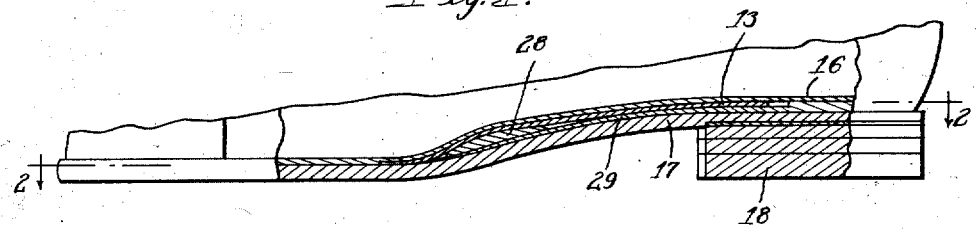
Figure 1 is a longitudinal section through a shoe equipped with a combined shank and arch support embodying my invention.

My invention in its preferred form contemplates the provision of a plate shaped to provide a shank member for strengthening the arched portion of a shoe between the heel and the tread portion, the shape and function of which will be presently more fully described. This plate may be pressed from sheet metal or may be otherwise suitably shaped and is intended to be permanently incorporated into the shoe structure. When the plate is embodied in a welted shoe, it has a relatively narrow posterior shank portion 13, the inside and outside edges 14 and 15 of which fit between the complemental inseam ribs 20 of the insole, the shank being thereby held against lateral displacement. As shown in Fig. 1, the shank is interposed between the insole 16 and outer or main sole 17 and overreaches the heel 18.

The anterior end portion 19 of the plate is relatively wide, filling the space between the diverging ribs and reaching to the ball portion of the shoe. The inside and outside edges 14 and 15 which follow the contour of the inseam ribs diverge in defining the marginal edges of the anterior end portion 19 and then turn inwardly at the widest point thereof, forming an arcuate anterior edge 21.

The cross-sectional shape of the plate is best shown in Figs. 3 to 9 inclusive, and the longitudinal section in Fig. 1. From these figures it will be noted that the posterior end portion 13 of the shank is flat and conforms to the level of the heel. The outside edge 15 lowers uniformly, that is, inclines downwardly and forwardly from a point in the shank portion 13, substantially to the intersection of the section line 8, Fig. 2. This lowered level is indicated by a base line 22 in Figs. 3 to 7 inclusive, in order to show the relative level and shape of the cross-section. The inside edge 14 extending forwardly from a point on the posterior end portion of the plate is increasingly higher at successive forward stages than opposite points on the outside edge until a point is reached substantially at the intersection of the cross-section 6. This will readily be seen by viewing Figs. 4 to 6 inclusive in which the level of the outside edge is indicated by dotted line 23, this high point being indicated by 24. The wide anterior end portion of the plate is arched upwardly both transversely and longitudinally, the transverse arch being best shown in Figs. 7 and 8, and the longitudinal arch in Figs. 1, 10 and 12. It will be here observed that the marginal portion of the anterior end is substantially in a common plane in said low level and that the inside edge between the points 24 and 25 slopes downwardly and forwardly at rather an abrupt angle. It will also be observed that the high point or crown of the transverse arch on the section 8 is at the point 26, while the high point at the section 7 is at 27. The high points referred to namely 24, 26 and 27, are substantially in the same horizontal plane; consequently an imaginary line connecting these points (as shown in dotted lines, Figs. 2 and 11) will indicate the highest points of the arch. It will be noted that this imaginary line reaches from the crown of the transverse arch shown in Fig. 8, posteriorly toward the inside edge of the plate, thus continuing the transverse arch lengthwise of the plate but so that the highest points of the transverse arch taken lengthwise of said continuation define a line oblique to the longitudinal axis of the plate. The peculiar shape of the arch, namely the elongation of the high part or crown longitudinally of the shoe, or in a line oblique to the longitudinal axis of the shoe as the line 24, 26 and 27, is one of the important characteristics of my invention and is materially different from any prior arch support so far as I am aware. It is this shape of the plate, or a similar shape for the insole, together with the position of the plate or equivalent insole supporting means in the shoe structure which primarily gives the beneficial results above-described. While the shape of my improved shank and arch support has been described somewhat in detail, this is for the purpose of conveying a better understanding of its function; but on the other hand it should be understood that this detailed description is for illustrative purpose merely for showing one practical embodiment of the invention, and deviations may be made in non-essential details.

In making a shoe embodying my improvements, the last for the insole will be shaped to arch the latter similarly to the arch of the plate, and a suitable filler pad 28 will be fitted beneath the arched portion of said plate. If desired, the usual filler strip 29 may be interposed between the plate and the outer sole. By reason of the foregoing construction, the plate will be securely held in the shoe against displacement, at its inner and outer sides by the inseam ribs and at its anterior end by the arched portion of the insole which is complemental to the arched formation of the plate. Additional means may be employed for resisting any tendency for the plate to shift rearwardly, such for example as small nails 31, passing through the posterior end of the plate into the heel structure. In Fig. 8 is shown in section a strip of felt interposed between the plate and the insole. This strip is merely a filling piece and extends throughout the length of the plate. It should be here noted that in practice any suitable filling strips or material may be used between the insole and the outer sole in conjunction with a shank plate or stiffening member to properly support the inner sole in the shape and form contemplated by my invention.

Referring now more particularly to Figs. 11 and 12, which show the relation of my improvements to the bones of a normal foot, the following will be observed: The plate extends substantially throughout the longitudinal arch of the foot and conforms in longitudinal section to such arch except that it has no pronounced curvature upwardly in the region of the crown of said longitudinal arch for the reason that I have found that such pronounced arch is not necessary in supporting the normal or average foot, and in fact, is detrimental thereto. The arched anterior end portion of the plate conforms to and supports the plantar surface of the foot throughout the metatarsal area, that is, between the anterior transverse arch at the juncture of the metatarsals and phalanges and the posterior transverse arch at the juncture or articulation of the tarsal and metatarsal bones. In Fig. 11, the metatarsal area referred to is indicated approximately by dotted lines 32 and 33 designating the anterior and posterior transverse arches, respectively. It will be observed from this view that the crown of the arched portion of the plate extends in an oblique line as above-described, the purpose of which is to continue the high portion of the transverse arch of the plate longitudinally toward the region approximately beneath the intersection of the inner longitudinal arch and the posterior transverse arch. This portion of the foot when not properly supported is one of the first to become weakened, thereby giving cause to displacement of the metatarsal bones as well as those in the region of the posterior transverse arch. The arched shape of the anterior end portion of the plate provides proportional support for the metatarsal bones, this support being carried to the highest level and extended from a central point of greatest pressure, posteriorly toward the inner longitudinal arch. It is not essential to my invention, however, that the high point of the transverse arch of the plate be extended along the oblique line described although it is important that the inner side of the plate in this region shall be higher than the outer side. As shown in the drawings, especially Figs. 1, 10 and 12, the longitudinal arch of the plate along its center provides continuous uninterrupted support unmarked by any depression or deformity. It will be more particularly noted that the shape of the shank plate and likewise of the top surface of the insole is characterized by the fact that the high point or portion of the longitudinal arch in the anterior region continues posteriorly and merges into the flatter longitudinal arch without depression, thus giving continuous support to the plantar surface from the medial portions of the first, second and third metatarsals, posteriorly to the articulations of the os calcis and astragalus region. Such support may be worn with comfort on the normal foot and prevents any weakening tendencies through the arched areas. It will also aid in correcting displacements in these areas for the reason that it provides a continuous and positive support properly proportioned, with respect to the transverse and longitudinal arch structures of the foot. It should be noted at this point that the plate is of sufficient resiliency to give the desired flexibility to the shank portion of the shoe and at the same time provides a firm support and reinforcement therefor.

My invention also contemplates the provision of means whereby greater resiliency is obtained in the arched anterior end of the plate, this being accomplished by making the inside, outside and anterior marginal edges of said arched portion independently resilient, as by recessing such edges at 34, the recesses radiating approximately from the crown of the arch. This provides resilient base portions 35 permitting the arched portion of the plate to yield slightly under pressure. When using this construction, the pad 28 is made of soft rubber or any suitable material.

It will be manifest from the foregoing that my improved shank and metatarsal arch support embodies such characteristics as make it suitable to be built into any shoe for strengthening it, lending comfort to the wearer, correcting displacements in the arched areas of the foot and preventing any weakening tendencies in such areas. My improvements are also of such character as to make them very practical as a commercial product. The construction is comparatively simple, inexpensive to install in a shoe, and will not shift or become displaced from its set position.

In putting my invention into practice, it should be understood that changes might be made in size, shape and proportions, and also of the material employed in producing the desired arch structure in a shoe, without departing from the spirit and scope of the invention as expressed in the appended claims; in which—

I claim:

1. A metatarsal arch support comprising a plate adapted to be inserted between the inner and outer soles of a shoe and being transversely and longitudinally arched for supporting the metatarsal area, the crown of the plate arch extending from substantially the center of said area, in a line oblique to the longitudinal axis of the shoe, posteriorly toward the inside edge of the plate.

2. A metatarsal arch support as set forth in claim 1, in which the outside edge inclines downwardly and forwardly from a point in the posterior end portion of the plate to a low level opposite the transverse arch of the plate.

3. A metatarsal arch support comprising a plate adapted to be inserted between the inner and outer soles of a shoe and being transversely and longitudinally arched for supporting the metatarsal area, the crown of the plate arch extending from substantially the center of said area, in a line oblique to the longitudinal axis of the shoe, posteriorly toward the inside edge of the plate, the outside edge of the plate inclining downwardly and forwardly from a point in the posterior end portion of the plate to a low level opposite the transverse arch of the plate, and the inside edge of the plate being higher than said outside edge from a point in the posterior end portion to substantially the transverse arch of the plate.

4. A combined shank and arch support of the character described, comprising a plate having a relatively narrow posterior portion adapted to overlie the shank and heel portion of the shoe and a relatively wide anterior portion beneath the metatarsal area, said anterior portion being arched to support said area, and the crown of the arch extending in a line oblique to the longitudinal axis of the shoe, posteriorly and toward the inside edge of the plate.

5. A combined shank and arch support of the character described comprising a plate having a posterior end portion the inside and outside edges of which are substantially parallel and an anterior end portion relatively wide so as to underlie the metatarsal bones, the inside and outside edges diverging from said posterior end portion to and throughout the greater part of said wide portion, said wide portion being arched conforming to the transverse metatarsal arch and the inside edge of the plate being higher than opposite points on the outside edge at transverse sections taken progressively forward from said posterior end portion substantially to the transverse arch of the plate.

6. A combined shank and arch support as set forth in claim 5 in which the crown of said arched portion follows a line oblique to the longitudinal axis of the shoe, reaching posteriorly substantially to the inside edge of the plate.

7. The combination in a shoe, of a combined shank and arch support of the character described comprising a resilient plate having a posterior shank portion and an anterior portion, the latter being arched for supporting the metatarsal area, said arched portion on its inner, outer and anterior side having marginal recesses, leaving intermediate resilient spaced portions, said plate being inserted between the inner and outer soles, and the inner sole being shaped to provide an arch complemental to that of the plate for preventing displacement of the latter.

8. The combination with a welted shoe, of a plate providing a combined shank and metatarsal arch support, the plate being inserted between the inner and outer soles, the inside and outside edges of the plate conforming to the shape of and fitting against the rib, the plate having a posterior end portion overlying the heel and an anterior end portion reaching substantially to the ball of the shoe, the outside edge portion of the plate being inclined forwardly and downwardly from a point in said posterior end portion to a low level in the anterior end portion, the anterior end portion being arched transversely from said low level and in a line oblique to the longitudinal axis of the shoe, and the inner sole being shaped to conform to the arched plate.

9. In a shoe, a shank member interposed between an insole and an outer sole, having a narrow elongated posterior portion and a widened anterior portion, the shank member being arched upwardly longitudinally along its center, the anterior portion of said longitudinal arch comprising approximately one-fourth of the length of the shank and having considerably shorter radii than the remaining posterior portion which is flatter, the said anterior portion being also arched upwardly transversely and presenting a somewhat spherical top surface, the longitudinal arch continuing from the highest point of said anterior portion posteriorly without depression, the shank member giving continuous support to the plantar surface from the medial portions of the first, second and third metatarsals, posteriorly to the articulations of the os calcis and astragalus bones.

10. In a shoe, the combination set forth in claim 9, in which the shank member along the inner longitudinal arch is higher than along the outer longitudinal arch, thereby giving support to the plantar surface along said inner longitudinal arch and the posterior transverse arch.

11. In a shoe, a shank member interposed between an insole and an outer sole, having a narrow posterior portion overreaching the heel and a widened anterior portion the front end of which reaches to the ball portion of the foot, the shank member being arched upwardly longitudinally and comprising two distinguishing arches, one a comparatively long flat arch between the heel and the widened anterior portion and the other a shorter more pronounced arch of considerably shorter radii and comprising the greater part of the length of the said widened anterior portion, the anterior longitudinal arch merging at its highest point without depression into the posterior longitudinal arch, the said widened portion of the shank being arched upwardly transversely, and the insole conforming to the shape of and being supported by the shank member.

12. In a shoe, in combination, an insole and an outer sole, the insole being shaped on a last to support the plantar surface of the normal foot when the shoe is worn, the insole being arched upwardly longitudinally to support the longitudinal arch of the foot, the anterior end portion of said longitudinal arch having considerably shorter radii than the posterior portion which is flatter, the insole being arched upwardly transversely across said anterior end portion so as to present a somewhat spherical top surface beneath the anterior and posterior transverse arches, the longitudinally arched surface providing continuous support to the plantar surface without depression from the medial portion of the first, second and third metatarsals posteriorly to the articulation of the os calcis and astragulus bones, the anteriorly arched portion also providing continuous support to the plantar surface longitudinally at a higher level along the inner longitudinal arch than the outer longitudinal arch, and means interposed between the insole and the outer sole for supporting the insole in the described shape.

13. In a shoe, an inner sole provided with a convexly elevated and twisted section, arranged therein to fit the metatarsal and longitudinal arches of the foot, said section extending from the ball of the foot substantially to the heel thereof, said section having a slightly convexed elevation above the inner surface of the inner sole at its forward end with a more sharply convexed and more elevated intermediate section, and which near its rear end is of a slighter convexity and elevation than at its front end or intermediate section, and at which rear end substantially merges with the level of the heel formation of the inner sole, the twist of said elevated section being such that it is higher for substantially its entire length on the inner side of the foot portion of the inner sole than on the outer side of the foot portion of the inner sole and which merges with said inner side formation.

NILS E. JOHNSON.